(12) United States Patent
Broeker et al.

(10) Patent No.: US 9,541,123 B2
(45) Date of Patent: Jan. 10, 2017

(54) CROSS-AXIS JOINT FOR A VEHICLE

(71) Applicant: ZF Friedrichshafen AG, Friedrichshafen (DE)

(72) Inventors: Klaus Broeker, Bohmte (DE); Melanie Kleinebenne, Hemsloh (DE); Markus Gutzlaff, Sindelfingen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 307 days.

(21) Appl. No.: 13/888,533

(22) Filed: May 7, 2013

(65) Prior Publication Data
US 2013/0294816 A1 Nov. 7, 2013

(30) Foreign Application Priority Data

May 7, 2012 (DE) .................. 10 2012 207 527

(51) Int. Cl.
F16C 11/06 (2006.01)
(52) U.S. Cl.
CPC ........ F16C 11/0614 (2013.01); F16C 11/0685 (2013.01); *Y10T 29/4994* (2015.01); *Y10T 403/32737* (2015.01)
(58) Field of Classification Search
CPC .... B60G 7/02; F16C 11/0614; F16C 11/0685; Y10T 403/32737
See application file for complete search history.

(56) References Cited

U.S. PATENT DOCUMENTS

| | | | |
|---|---|---|---|
| 3,378,287 A * | 4/1968 | Ulderup | ........................ 403/51 |
| 4,386,869 A | 6/1983 | Smith | |
| 4,844,627 A | 7/1989 | Speakman | |
| 4,883,263 A * | 11/1989 | Buhl | .............................. 267/293 |
| 5,033,722 A | 7/1991 | Lammers | |
| 5,230,580 A * | 7/1993 | Henkel | ......................... 403/135 |
| 5,364,191 A | 11/1994 | Gruber | |
| 6,719,476 B2 * | 4/2004 | Hisi | .............................. 403/137 |
| 7,357,591 B2 * | 4/2008 | Broker et al. | ................ 403/132 |
| 7,438,493 B2 * | 10/2008 | Holmes et al. | ............... 403/134 |
| 7,510,344 B2 * | 3/2009 | Kondoh | ........................ 403/135 |
| 7,654,766 B2 | 2/2010 | Zuge et al. | |

(Continued)

FOREIGN PATENT DOCUMENTS

| DE | 42 16 559 A1 | 11/1993 |
|---|---|---|
| DE | 196 27 753 A1 | 1/1998 |

(Continued)

OTHER PUBLICATIONS

Heissling, Bernd: "Fahrwerkhandbuch", ATZ/MTZ-Fachbuch, May 2007.

(Continued)

*Primary Examiner* — Joshua Kennedy
(74) *Attorney, Agent, or Firm* — Davis & Bujold, PLLC; Michael J. Bujold

(57) ABSTRACT

A sleeve joint for a vehicle with an outer sleeve (3) that extends in an axial direction (8). Two clamp rings (10, 11) are arranged inside the outer sleeve (3) and a ball socket (5) is arranged inside the outer sleeve (3). A ball sleeve (7) is fitted in and able to move in the ball socket (5). An inner sleeve (4) is inserted into the outer sleeve (3) and positioned, in the axial direction, between the clamp rings (10, 11) between which the inner sleeve and the ball socket (5) are fitted.

12 Claims, 2 Drawing Sheets

(56) References Cited

U.S. PATENT DOCUMENTS

| | | | |
|---|---|---|---|
| 7,658,546 B2 | 2/2010 | Clarke et al. | |
| 8,783,702 B2* | 7/2014 | Lee | B60G 7/02 280/124.134 |
| 8,783,993 B2* | 7/2014 | Brunneke et al. | 403/133 |
| 8,925,944 B2* | 1/2015 | Byrnes | 280/124.134 |
| 8,985,604 B2* | 3/2015 | Hopson et al. | 280/124.134 |
| 9,181,975 B2* | 11/2015 | Rechtien | F16C 11/0614 |
| 2009/0060633 A1* | 3/2009 | Broker et al. | 403/2 |
| 2013/0177347 A1* | 7/2013 | Rechtien et al. | 403/122 |

FOREIGN PATENT DOCUMENTS

| | | | | |
|---|---|---|---|---|
| DE | 101 57 933 A1 | 6/2002 | | |
| DE | 101 24 843 A1 | 11/2002 | | |
| DE | 10124843 A1 * | 11/2002 | | F16C 7/02 |
| DE | 101 34 106 A1 | 1/2003 | | |
| DE | 10 2005 060 490 A1 | 6/2007 | | |
| DE | 102008042211 A1 * | 4/2010 | | F16C 11/0628 |
| EP | 2 284 408 A1 | 2/2011 | | |

OTHER PUBLICATIONS

German Search Report Corresponding to 10 2012 207 527.5 mailed Dec. 14, 2012.

* cited by examiner

CROSS-AXIS JOINT FOR A VEHICLE

This application claims priority from German patent application serial no. 10 2012 207 527.5 filed May 7, 2012.

FIELD OF THE INVENTION

The invention concerns a sleeve joint for a vehicle, with an outer sleeve that extends in an axial direction, two clamp rings arranged in the outer sleeve, a ball socket arranged in the outer sleeve and a ball sleeve fitted and able to move in the ball socket. In addition the invention concerns a method for producing a sleeve joint, such that in an outer sleeve that extends in an axial direction there are arranged two clamp rings and a ball socket in which a ball sleeve is fitted and able to move.

BACKGROUND OF THE INVENTION

A sleeve joint of that type is described for example on page 314 of the Chassis Handbook, Heißing/Ersoy, $1^{st}$ Edition 2007, ISBN 978-3-8348-0105-0.

Nowadays sleeve joints are used for various purposes in vehicles and are press-fitted for example into bearing eyes of spring links, wheel carriers or shock absorber struts. However, the press fitting of the joint or its outer sleeve into a bearing eye often encounters conflicting aims. The press-fitting force that is determined by the interference fit overlap of the outer sleeve diameter relative to the bearing eye diameter and the friction coefficients, has to reach a minimum value in order to ensure a proper interference fit of the joint in the axial direction. This interference fit is determined by established minimum press-out forces or dynamic loads. However, due to the interference fit overlap the diameter of the outer sleeve can be reduced to such an extent that the movement resistance torque of the ball sleeve increases. Such an increase is often undesired since its result is to impede proper adjustment of the chassis components and hence adversely affect the comfort of the suspension. Furthermore, such an increase is difficult to control and depends almost only on the diameter tolerances of the components. To be able in some degree to control the torque increase, it is therefore necessary to specify very precise and therefore expensive tolerance limits.

SUMMARY OF THE INVENTION

Accordingly, one objective is to provide a joint design which can be produced inexpensively and can reduce the above-mentioned problems. In particular, the press fitting of the joint into a bearing eye should have no, or only little effect on the fitting of the ball sleeve, but must nevertheless be able to ensure a secure fixing of the joint in the axial direction. Preferably, the outer sleeve should be able to compensate existing tolerances of the press fit and keep the joint characteristics almost constant.

The sleeve joint for a vehicle, in particular a motor vehicle, comprises an outer sleeve that extends in an axial direction, two clamp rings arranged in the outer sleeve, a ball socket arranged in the outer sleeve, a ball sleeve fitted into the ball socket so that it can move, in particular rotate and/or swivel and, inserted into the outer sleeve and positioned in the axial direction between the clamp rings, an inner sleeve in which the ball socket fits.

By virtue of the inner sleeve the ball socket can to a certain extent be protected against the effects of an outer sleeve diameter reduction. In particular, the ball socket fits into the outer sleeve with the inner sleeve interposed between them. Thus, the sleeve joint can be pressed into a bearing eye of a vehicle component without changing, or changing too much, a radial stress acting upon the ball socket. The frictional torque produced during the production of the sleeve joint or adjusted (calibrated) during its production remains unchanged or nearly so.

The clamp rings are preferably radially in contact with the outer sleeve and/or expanded tightly against it. In particular, the clamp rings are press-fitted into the outer sleeve. Thus, at least part of the forces produced by a diameter reduction of the outer sleeve can be taken up by the clamp rings. The term "radial" denotes in particular a direction, or any direction, which is perpendicular to the axial direction.

According to a further development the outer diameter of the inner sleeve is smaller than the inner diameter of the outer sleeve. Preferably, a free space is provided between the inner and outer sleeves, which preferably extends over the length of the inner sleeve, in particular over its full length. The length of the inner sleeve is preferably its length in the axial direction. Preferably, and particularly in the radial direction, the inner sleeve is not in contact with the outer sleeve. Thus the sleeve joint can be pressed into a bearing eye of a vehicle component with an outer sleeve diameter reduction, without the diameter reduction having any, or any considerable effect on the ball socket and/or on its fit. Preferably, the diameter of the outer sleeve can be reduced with a decrease of the radial size of the free space, in particular without effect on the ball socket and/or on its fit. This remains possible until the free space has been reduced to an extent such that the outer and inner sleeves are in contact. Only then can a further diameter reduction of the outer sleeve lead to a diameter reduction of the inner sleeve and hence affect the ball socket and/or its fit.

According to one design the outer sleeve is pressed into a bearing eye of a vehicle component in such manner that the outer sleeve comes into preferably radial contact with the inner sleeve. In particular, owing to the outer sleeve diameter reduction brought about by the press fitting, the free space disappears. It is also possible, by reducing the diameter of the outer sleeve, to reduce the diameter of the inner sleeve as well, for example until a desired prestressing of the ball socket and/or its mounting has been achieved. The advantage of this compared with the prior art is in particular that not all of the outer sleeve diameter reduction has an effect on the ball socket, but only the reduction of the inner sleeve's diameter. In this way excessively high radial prestressing of the ball socket can be avoided. The bearing eye is or comprises in particular a through-hole in the vehicle component, which is preferably cylindrical.

If the through-hole of the bearing eye is only approximately cylindrical and therefore does not have a perfectly circular section but one which, for example due to manufacturing tolerances or because of heat input from nearby welds is to some extent out-of-round, this tolerance can be compensated by the aforesaid free space between the outer and inner sleeves. Thus, a change of the friction torque due to a bearing eye which is not exactly circular is effectively managed.

The outer sleeve is preferably tubular and/or hollow-cylindrical. In particular the outer sleeve is made of metal, preferably steel. Moreover, the inner sleeve too is preferably tubular and/or hollow-cylindrical and, in particular, made of metal, preferably steel. The inner sleeve can also be made of plastic, materials suitable for this being polyamide, in particular PA66, or a plastic such as polyetherimide (PEI) which has high-temperature strength.

In particular, the inner sleeve is shorter than the outer sleeve in the axial direction. Preferably, in the axial direction the inner sleeve is positioned centrally in the outer sleeve. Advantageously, the outer sleeve and/or the inner sleeve and/or the clamp rings and/or the ball socket are arranged concentrically, in particular relative to a longitudinal central axis that extends in the axial direction. Preferably, the outer sleeve and/or the inner sleeve and/or the clamp rings and/or the ball socket are designed rotation-symmetrically, in particular relative to the longitudinal central axis. The ball socket and the inner sleeve can even be made integrally, and in such case a material with high-temperature strength such as PEI should be chosen.

The ball sleeve is preferably designed rotation-symmetrically, in particular relative to a longitudinal axis of the ball sleeve. When the joint is not deflected, this ball sleeve longitudinal axis preferably coincides with the longitudinal central axis. Preferably, the ball sleeve extends, in the axial direction and/or in the direction of the ball sleeve's longitudinal axis, out beyond the outer sleeve on both sides. In particular, the ball sleeve extends through the clamp rings. In its axially central area the ball sleeve preferably has a joint ball by means of which the ball sleeve is fitted in the ball socket so that it can move, in particular rotate and/or swivel. Thus, the sleeve joint can also be called a ball sleeve joint. Advantageously, the ball sleeve with its joint ball is fitted so that it can slide in the ball socket. Preferably a central hole extends through the ball sleeve, preferably in the direction of its longitudinal axis. The ball sleeve is preferably made of metal, in particular steel.

The joint ball preferably has a spherical bearing surface. Furthermore, the ball socket preferably has a bearing surface in the shape of a hollow sphere, which is preferably adapted to fit the joint ball and/or the spherical bearing surface of the ball sleeve. In particular, the hollow-spherical bearing surface rests and can slide against the joint ball and/or the spherical bearing surface. The ball socket preferably consists of plastic, in particular polyoxymethylene (POM).

The clamp rings are preferably made of metal, in particular steel. Preferably, the clamp rings are of identical design. In particular, the clamp rings have the same outer diameter. Moreover, the clamp rings preferably have the same inner diameter. Preferably, a respective sealing bellows is fitted onto each clamp ring, which extends in particular as far as the ball sleeve and forms a sealing contact with it.

Before the clamp rings are pressed into the outer sleeve, the outer diameter of the clamp rings is in particular larger than the inner diameter of the outer sleeve. Furthermore, the outer diameter of the clamp rings is preferably larger than the outer diameter of the inner sleeve, in particular before the outer sleeve has been pressed into the bearing eye. Before the inner sleeve has been arranged in the outer sleeve, the outer diameter of the inner sleeve is for example smaller, the same or larger than the inner diameter of the outer sleeve. By pressing the outer sleeve into the bearing eye, the outer diameter of the clamp rings can preferably be reduced, in particular to approximately the outer diameter of the inner sleeve. Thus, when the sleeve joint has been pressed into the bearing eye, the clamp rings and the inner sleeve preferably have the same outer diameter.

According to a further development the ball socket and the mounting are radially prestressed, in particular by the inner sleeve. This can be done for example by pressing the ball socket into the inner sleeve. Furthermore, the ball socket can be inserted into the inner sleeve and the diameter of the latter then reduced. Advantageously, the ball socket is held fast in the inner sleeve.

The inner sleeve and/or the ball socket are in particular clamped axially between the clamp rings. Preferably, the ball socket and/or the bearing are axially prestressed, in particular by the clamp rings and/or the inner sleeve. The clamp rings are preferably axially supported on the inner sleeve and/or on the ball socket, and/or are axially in contact against the inner sleeve and/or the ball socket. Thus, when the clamp rings are pressed into the outer sleeve the axial prestressing of the ball socket and/or the bearing can be adjusted. In particular, the inner sleeve and/or the ball socket form the axial stop for the clamp rings. Advantageously, the inner sleeve and/or the ball socket are axially fixed within the outer sleeve by means of the clamp rings.

In a further development, on its outer circumference the inner sleeve has an all-round groove axially delimited on both sides. This groove, also referred to as a clearance groove, provides an additional possibility for reducing the effect of an outer sleeve diameter reduction upon the ball socket and/or the bearing. If the diameter of the outer sleeve is reduced to an extent that owing to this outer sleeve diameter reduction the diameter of the inner sleeve is also reduced, then the force extended by the outer sleeve on the inner sleeve acts essentially on the axial edges of the groove. At the axial level of the groove edges, relatively small friction radii preferably act between the joint ball and the ball sleeve. In particular, these friction radii are substantially smaller than the radius of the joint ball. Thus, even if an inner sleeve diameter reduction is brought about by the diameter reduction of the outer sleeve, the friction of the ball sleeve in the ball socket is kept relatively low.

According to a further development the clamp rings are positioned in the axial direction between the axial ends of the outer sleeve which, in particular, are deformed inward, preferably bent or rolled. Thus, the clamp rings are also fixed in the axial direction in the outer sleeve in a form-enclosed manner. The axial ends of the outer sleeve can preferably be deformed by rolling. The axial ends are also called rolled edges or locking edges.

The vehicle component is in particular a chassis component. For example, the vehicle component is a spring link, a wheel carrier or a shock-absorber strut.

The invention also relates to a method for producing a sleeve joint such that a ball socket is arranged in an outer sleeve that extends in an axial direction, in the ball socket a ball sleeve is fitted so that it can move, in particular rotate and/or swivel, in the outer sleeve an inner sleeve is held, the ball socket is inserted into the inner sleeve, and into the outer sleeve two clamp rings are pressed, causing the sleeve to expand radially, so that the inner sleeve is arranged between the clamp rings in the axial direction.

The sleeve joint produced by the method is preferably the sleeve joint described earlier. In particular, the method can be developed further in accordance with all the design features explained in connection with the previously described sleeve joint. Furthermore, the previously described sleeve joint can be developed further in accordance with all the features explained in connection with the method.

By pressing the clamp rings into the outer sleeve, in particular an all-round free space envisaged between the inner and outer sleeves is produced or enlarged, this space preferably extending over the length of the inner sleeve, in particular over its full length. The length of the inner sleeve is preferably its axial length.

When the clamp rings are pressed into the outer sleeve the outer diameter of the clamp rings is, in particular, larger than the outer diameter of the inner sleeve. When the inner sleeve is arranged in the outer sleeve the outer diameter of the inner sleeve can be smaller, equal to or larger than the inner diameter of the outer sleeve. For example, the inner sleeve is pressed into the outer sleeve before the clamp rings are pressed into the outer sleeve. Thus, the inner sleeve is fixed in the outer sleeve with a press fit. In such a case, before the inner sleeve is positioned in the outer sleeve, the outer diameter of the inner sleeve is preferably larger than the inner diameter of the outer sleeve. By pressing the clamp rings into the outer sleeve the press fit between the inner and outer sleeves is preferably loosened. This happens particularly because of the radial expansion of the outer sleeve when the clamp rings are pressed in. The clamp rings are preferably pressed into the outer sleeve one after the other. In particular, the clamp rings are pressed in on sides of the outer sleeve opposite one another in the axial direction.

In a further development the inner sleeve is inserted, in particular pressed into the outer sleeve. Then, preferably a first one of the clamp rings is pressed into the outer sleeve, so expanding the outer sleeve radially. Then, preferably the second clamp ring is pressed into the outer sleeve and expands the latter radially. Each of the clamp rings is preferably pressed into the outer sleeve until it comes into axial contact with the inner sleeve. In particular, the clamp rings contact the inner sleeve on opposite sides in the axial direction.

Between the pressing in of the first clamp ring and of the second clamp ring, the ball socket is preferably inserted into the inner sleeve, in particular pressed into it. In addition, the ball sleeve is fitted into the ball socket. Preferably, the ball sleeve is fitted into the ball socket before the ball socket is inserted or pressed into the inner sleeve.

After the clamp rings have been pressed into the outer sleeve, the axial ends of the outer sleeve are preferably deformed radially inward, in particular by bending or rolling. After being deformed, the radial ends of the outer sleeve preferably form axial stops for the clamp rings.

Preferably, once the clamp rings have been pressed into the outer sleeve and/or its axial ends have been deformed, the outer sleeve is pressed into a bearing eye of a vehicle component, the diameter of the outer sleeve being reduced by this process. During this, in particular the radial width of the free space is reduced. For example, when the outer sleeve is pressed into the bearing eye the diameter of the outer sleeve is reduced to an extent such that the outer sleeve comes in contact with the inner sleeve, particularly in the radial direction. The sleeve joint is preferably used in a vehicle, preferably a motor vehicle.

In one design, the outer sleeve is in the form of a tube and the inner sleeve, which is shorter in the axial direction, serves as a support for the clamp rings and preferably produces the axial prestressing of the joint. For the assembling of the joint, the inner sleeve is inserted into the outer sleeve with a slight interference-fit overlap. For the further assembling of the joint the clamp rings are pressed into the outer sleeve. During this it is acceptable or even desirable for the previously press-fitted combination of the inner and outer sleeves to be separated. There can even be a small gap between the outer and the inner sleeve. Likewise, it is possible for the inner sleeve first to be inserted into the outer sleeve without the use of force, so that the gap present between the inner and outer sleeves is then enlarged by pressing in the clamp rings. The combination should be chosen appropriately for individual cases and for the desired behavior of the sleeve joint when it has been pressed into the bearing eye of the vehicle component.

When the sleeve joint is fully assembled, the bearing is preferably axially prestressed by the clamp rings and the inner sleeve, whereas the ball socket is preferably prestressed radially by the inner sleeve. When the sleeve joint has been pressed into the bearing eye of the vehicle component, the outer sleeve diameter reduction has no, or only a small effect on the radial prestressing of the joint bearing. That behavior persists until a further reduction of the outer sleeve's diameter has an appreciable effect on the inner sleeve. However, until that effect comes about the pressing-in force is taken up substantially by the clamp rings. An advantageous side effect is that the radial force imposed on the outer circumference of the clamp rings results in a good seal between the outer sleeve and the clamp rings. Thus, any pre-existing capillaries can be closed so that the penetration of dirt and water to the inside of the sleeve joint can be reliably prevented.

Moreover it is possible, in the axially central area of the outer circumferential surface of the inner sleeve, to provide the, or a clearance which, in particular, extends all the way round. This provides a further possibility for reducing the effect of appreciable overlaps upon the bearings. But if a diameter reduction of the inner sleeve takes place or even if one is made necessary due to high loading of the sleeve joint, the force is transmitted essentially to the axially outer areas of the ball socket. However, in relation to rotational movement of the ball sleeve relative to the inner sleeve and/or the outer sleeve, the effective friction radii in the axially outer areas are smaller. The force is therefore supported by smaller friction radii, so the torque is also smaller.

BRIEF DESCRIPTION OF THE DRAWINGS

Below, the invention is described with reference to a preferred embodiment and to the drawings, which show.

DETAILED DESCRIPTION OF THE PREFERRED EMBODIMENTS

Figure 1:
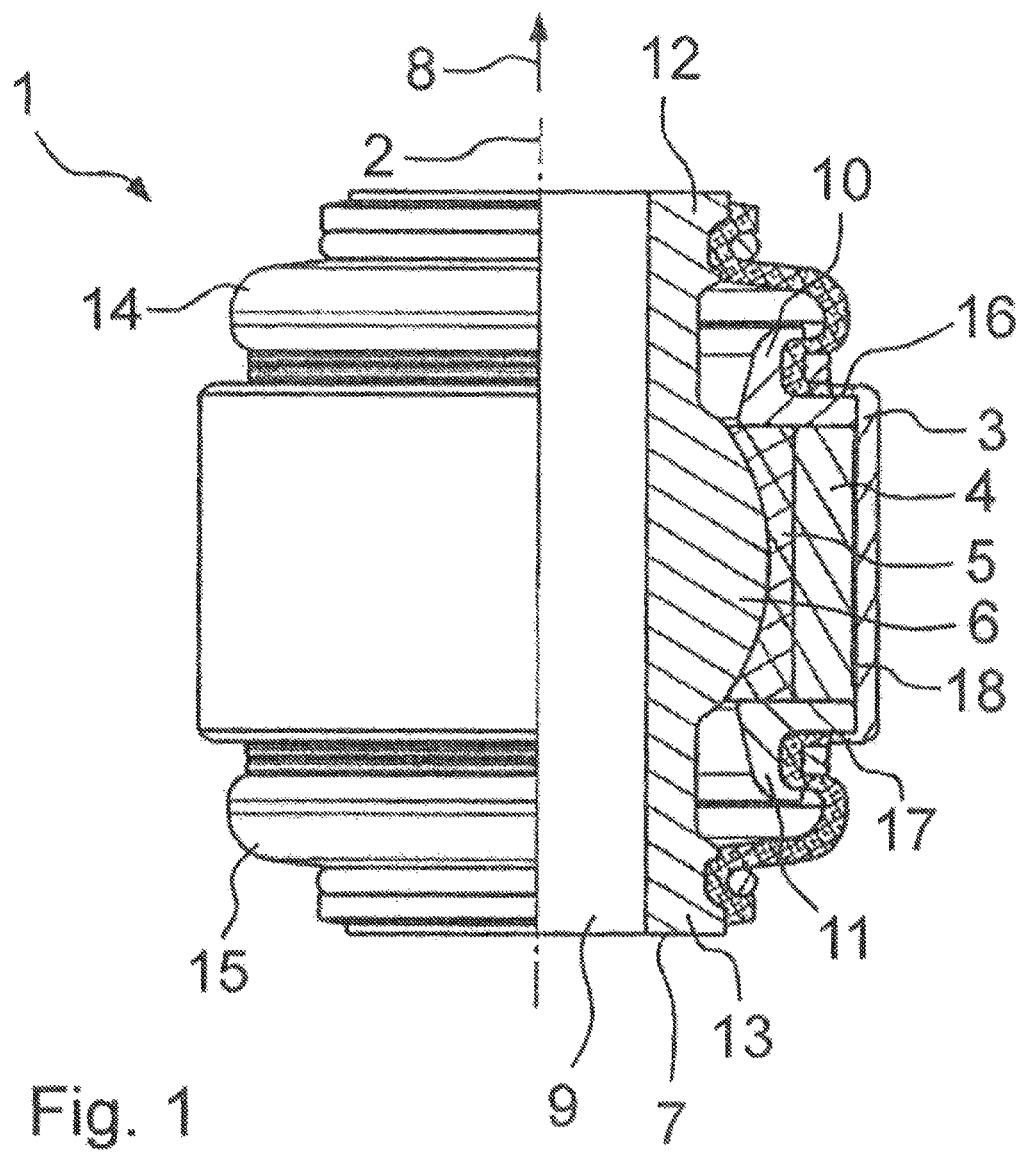
FIG. 1: A partially sectioned view of a sleeve joint according to one embodiment.

FIG. 1 shows an embodiment of a sleeve joint 1 which is designed rotationally symmetrical relative to a longitudinal central axis 2 which extends in an axial direction 8. To the left of the longitudinal central axis 2, an outside view of the sleeve joint 1 is shown, whereas in contrast, to the right of the central axis 2, a longitudinal section through the sleeve joint 1 is shown. Into an outer sleeve 3 is inserted an inner sleeve 4, inside which a ball socket 5 is fitted with some radial pre-stress. Inside the ball socket 5 a ball sleeve 7 provided with a joint ball 6 is fitted so that with its joint ball 6 it can rotate and swivel. A through-hole 9 extends all the way through the ball sleeve 7 in the axial direction 8.

Into the outer sleeve 3 are press-fitted two clamp rings 10 and 11, which rest axially against the ball socket 5 and the inner sleeve 4, which are arranged in the axial direction 8 between the clamp rings 10 and 11 so that the ball socket 5 is under the same axial pre-stress. The ball sleeve 7 extends on both sides out of the outer sleeve 3 and thus also axially through the clamp rings 10 and 11. Onto the axial ends 12 and 13 of the ball sleeve 7 projecting out of the outer sleeve 3 in each case a respective sealing bellows 14 and 15 is fixed, such that the sealing bellows 14 extends from the axial end 12 to the clamp ring 10 and is attached thereto, whereas the sealing bellows 15 extends from the axial end 13 to the clamp ring 11 and is attached thereto. Furthermore, the axial ends 16 and 17 of the outer sleeve 3 are in each case bent radially inward so that they are axially in contact with the clamp rings 10 and 11. Thus, the axial ends 16 and 17 hold the clamp rings 10 and 11 in the outer sleeve 3 in a form-enclosing manner.

The outer diameter of the hollow-cylindrical inner sleeve 4 is smaller than the inner diameter of the hollow-cylindrical outer sleeve 3, so that between the inner sleeve 4 and the outer sleeve 3 there is an all-round free space 18 which extends in the axial direction 8 over the full length of the inner sleeve 4. Furthermore, an all-round groove 20 is formed in the axially central area of the outer circumferential surface 19 of the inner sleeve 4, which is delimited axially on both sides. The axial edges 21 and 22 of the groove 20 thus project radially from the base of the groove 20. The outer circumferential surface 19, the all-round groove 20 and the axial edges 21 and 22 can be seen in FIG. 3 in particular.

Figure 2:
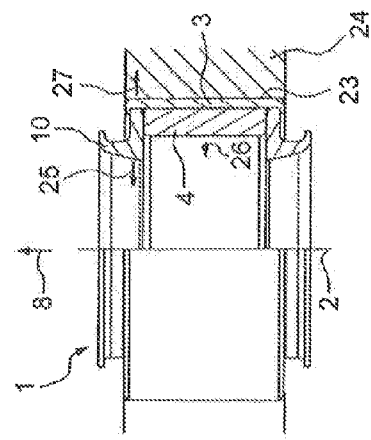
FIG. 2: A partially sectioned view of the sleeve joint after it has been pressed into a bearing eye of a chassis component.

FIG. 2 shows the sleeve joint 1 in a condition after it has been pressed into a bearing eye 23 of a chassis component 24, the ball sleeve, the ball socket and the sealing bellows having been omitted from the drawing. To the left of the longitudinal central axis 2 an outside view of part of the chassis component 24 is shown, whereas in contrast, to the right of the central axis 2, part of the chassis component 24 is shown in section. In particular, the bearing eye 23 is in the form of a cylindrical through-hole formed in the chassis component 24. By pressing the sleeve joint 1 with its outer sleeve 3 into the bearing eye 23, the diameters of the outer sleeve 3, the clamp rings 10 and 11 and the inner sleeve 4 have been reduced. Since before the sleeve joint 1 was pressed into the bearing eye 23 the outer diameter of the clamp rings 10 and 11 was larger than the outer diameter of the inner sleeve 4, the diameter reduction of the clamp rings 10 and 11 is greater than that of the inner sleeve 4, as indicated by the different lengths of the arrows 25 and 26. In addition, an arrow 27 indicates that this pressing in has also increased the diameter of the bearing eye 23 itself. Owing to the diameter reduction of the outer sleeve 3, the free space 18 has disappeared. However, the groove 20 is still present so the forces exerted by the outer sleeve 3 on the inner sleeve 4 pass essentially via the rim edges 21 and 22. The diameter reduction of the inner sleeve 4 increases the radial prestressing of the ball socket 5, in such manner that as viewed in the axial direction 8 the radial forces exerted by the ball socket 5 on the a joint ball 6 are a maximum in particular at the level of the groove edges 21 and 22.

Figure 3:
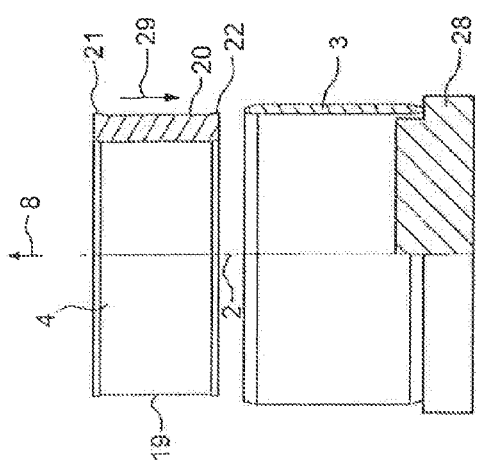
FIG. 3: A partially sectioned view of an outer sleeve and an inner sleeve before assembly.

FIGS. 3 to 6 show various stages in the production of the sleeve joint 1. The arrangement in each case is shown from the outside to the left of the longitudinal central axis 2 and in cross-section to the right of the central axis 2. In FIG. 3 the outer sleeve 3 is set onto an assembly tool 28, after which the inner sleeve 4 is pressed into the outer sleeve 3 in the direction opposite to the arrow 8. Before the inner sleeve 4 is pressed into the outer sleeve 3, the outer diameter of the inner sleeve 4, at least in the area of the groove edges 21 and 22, is larger than the inner diameter of the outer sleeve 3. The force required for pressing in is indicated by the arrow 29.

Figure 4:
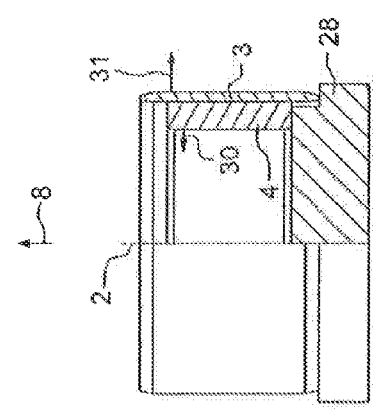
FIG. 4: A partially sectioned view of the outer sleeve with the fitted inner sleeve.

FIG. 4 shows the inner sleeve 4 in its assembled position, such that it has been press-fitted into the outer sleeve. During the pressing of the inner sleeve 4 into the outer sleeve 3, the diameter of the inner sleeve 4 has been reduced and that of the outer sleeve 3 has been increased. These diameter changes are indicated by the arrows 30 and 31 respectively. Then the clamp ring 10 is pressed into the outer sleeve 3 in the direction opposite to the arrow 8, until it comes axially in contact with the inner sleeve 4.

Figure 5:
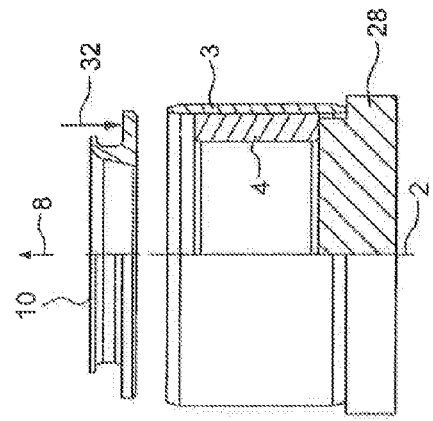
FIG. 5: The arrangement as in FIG. 4 with a clamp ring before assembly.
Figure 6:
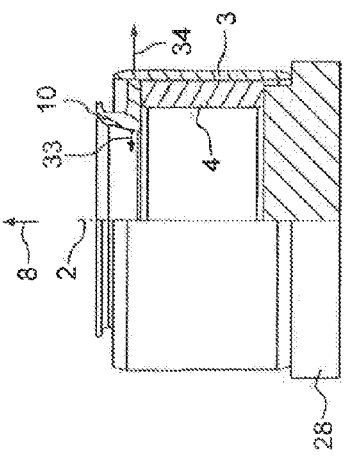
FIG. 6: The arrangement as in FIG. 4 with the clamp ring fitted.

The condition before the clamp ring 10 has been pressed in is shown in FIG. 5, in which the force required for pressing in is indicated by the arrow 32. The pressed-in condition of the clamp ring 10 is shown in FIG. 6, wherein the pressing in of the clamp ring 10 has reduced its diameter while in contrast the diameter of the outer sleeve 3 has been increased. The diameter reduction of the clamp ring 10 and the diameter increase of the outer sleeve 3 are indicated by the arrows 33 and 34 respectively. The diameter increase of the outer sleeve 3 caused by pressing in the clamp ring 10 is also referred to as its radial expansion and its extent is sufficient for the press fit of the inner sleeve 4 in the outer sleeve 3 to be loosened in the area of the axial groove edge 21.

Having reached the situation shown in FIG. 6, the assembly tool 28 is now removed so that the following step of fitting the ball socket 5 and the second clamp ring 11 in the direction of the arrow 8 can take place. For this, the assembly formed by the outer sleeve 3, the inner sleeve 4 and the clamp ring 10 is set onto another assembly tool in the direction of the arrow 8. First, the ball socket 5 is pressed into the inner sleeve 4 in the direction of the arrow 8, and is thereby prestressed radially. Preferably, during this the ball sleeve 7 has already been fitted into the ball socket 5 at this stage. Then, the second clamp ring 11 is pressed into the outer sleeve 3 in the direction of the arrow 8 until it comes axially in contact with the inner sleeve 4 on the side of the inner sleeve 4 axially opposite to the first clamp ring 10. Compared with the fitting of the first clamp ring 10 the ball socket 5 and/or the second clamp ring 11 are fitted from the axially opposite side, so that the inner sleeve is positioned, in particular clamped, axially between the clamp rings 10 and 11. The outer sleeve 3 is radially expanded by pressing in the second clamp ring 11, so that the press fit of the inner sleeve 4 in the area of the axial groove edge 22 is also loosened. Accordingly, due to the pressing in of the two clamp rings 10 and 11 the free space 18 that extends over the full length of the inner sleeve 4 is formed, this free space extending all round the longitudinal central axis 2. Finally the axial ends 16 and 17 of the outer sleeve 3 are deformed radially inward and the sealing bellows 14 and 15 are fitted, so as to produce the sleeve joint 1 as shown in FIG. 1.

INDEXES

1 Sleeve joint
2 Longitudinal central axis of the sleeve joint
3 Outer sleeve
4 Inner sleeve
5 Ball socket
6 Joint ball
7 Ball sleeve
8 Axial direction
9 Through-hole
10 Clamp ring 11 Clamp ring
12 Axial end of the ball sleeve
13 Axial end of the ball sleeve
14 Sealing bellows
15 Sealing bellows
16 Axial end of the outer sleeve
17 Axial end of the outer sleeve
18 All-round free space
19 Outer circumferential surface of the inner sleeve
20 All-round groove
21 Axial edge of the groove
22 Axial edge of the groove
23 Bearing eye
24 Chassis component
25 Diameter reduction of the clamp ring
26 Diameter reduction of the inner sleeve
27 Diameter increase of the bearing eye
28 Assembly tool
29 Force
30 Diameter reduction of the inner sleeve
31 Diameter increase of the outer sleeve
32 Force
33 Diameter reduction of the clamp ring
34 Diameter increase of the outer sleeve

The invention claimed is:

1. A sleeve joint, capable of engaging with a vehicle component of a vehicle, the sleeve joint comprising:
a ball sleeve (7) having a through-hole (9) extending in an axial direction (8) through the ball sleeve (7);
an outer sleeve (3) extending in the axial direction (8);
first and second separate and axially spaced apart clamp rings (10, 11) being arranged radially inside the outer sleeve (3);
a first portion of each of the first and the second clamp rings (10, 11) being axially and radially surrounded by a respective axial end (16, 17) of the outer sleeve (3), such that the outer sleeve (3) prevents the first and the second clamp rings (10, 11) from moving axially away from one another;
a second portion of each of the first and the second clamp rings (10, 11) extending axially beyond the respective axial ends (16, 17) of the outer sleeve (3) and supporting a respective bellows seal;
an inner sleeve (4) being arranged radially inside the outer sleeve (3);
a ball socket (5) being arranged radially inside the inner sleeve (4);
the ball sleeve (7) being movably fitted in the ball socket (5);
the ball socket (5) and the inner sleeve (4) having a same axial length and both being positioned and extending axially between the first and the second clamp rings (10, 11) so that a first end of the ball socket (5) directly abuts against the first clamp ring (10) while a second end of the ball socket (5) directly abuts against the second clamp ring (11); and
an annular free space (18) is formed between the inner sleeve (4) and the outer sleeve (3) and extends over a full axial length of the inner sleeve (4).

2. The sleeve joint according to claim 1, wherein the outer sleeve (3) is pressed into a bearing eye (23) of the vehicle component (24) and radially contacts the inner sleeve (4); and at least a portion of each of the first and the second clamp rings (10, 11) is arranged partially inside a portion of the outer sleeve (3) and the inner sleeve (4) and the ball socket (5).

3. The sleeve joint according to claim 1, wherein the ball socket (5) is radially prestressed by the inner sleeve (4).

4. The sleeve joint according to claim 1, wherein the ball socket (5) is axially prestressed by the clamp rings (10, 11), and the ball socket (5) is axially supported, on opposed ends, by the first and second clamp rings (10, 11).

5. The sleeve joint according to claim 1, wherein an outer circumference of the inner sleeve (4) has an all-round groove (20) which is delimited, in the axial direction (8), on both sides.

6. The sleeve joint according to claim 1, wherein the first and the second clamp rings (10, 11) are pressed radially outward and thereby into the outer sleeve (3), and the first and the second clamp rings (10, 11) are spaced apart axially from one another by both the ball socket (5) and the inner sleeve (4).

7. A method of producing a sleeve joint capable of engaging with a vehicle component of a vehicle, such that a ball sleeve (7) has a through-hole (9) extending through the ball sleeve (7) in an axial direction (8), an inner sleeve (4) is arranged inside an outer sleeve (3), a ball socket (5) is arranged in the inner sleeve (4), and the ball sleeve (7) is fitted into and can move within the ball socket (5), the method comprising the steps of:
engaging the outer sleeve (3) with the vehicle component (24);
inserting the inner sleeve (4) into the outer sleeve (3);
inserting the ball socket (5) into the inner sleeve (4);
radially expanding the outer sleeve (3) by inserting first and second clamp rings (10, 11) into the outer sleeve (3); and
pressing the first and the second clamp rings (10, 11) into the outer sleeve (3);
bending respective axial ends (16, 17) of the outer sleeve (3) radially inward so that a first portion of each of the first and the second clamp rings (10, 11) is axially and radially surrounded by the respective axial ends (16, 17) of the outer sleeve (3), such that the outer sleeve prevents the first and the second clamp rings from moving axially away from one another;
fitting a respective sealing bellows (14, 15) onto respective axial ends (12, 13) of the ball sleeve (7) and enveloping a second portion of each of the axially spaced apart clamp rings (10, 11) extending axially beyond the respective axial ends (16, 17) of the outer sleeve (3) such that the inner sleeve (4) and the ball socket (5), which have a same axial length, extend and are axially positioned between the first and the second clamp rings (10, 11), and a first end of the ball socket (5) directly abuts against the first clamp ring (10) while a second end of the ball socket (5) directly abuts against the second clamp ring (11); and
either forming or enlarging an all-round free space (18), between the inner sleeve (4) and the outer sleeve (3), by pressing the first and the second clamp rings (10, 11) into the outer sleeve (3), and extending the all-round free space over an entire axial length of the inner sleeve (4).

8. The method according to claim 7, further comprising pressing the inner sleeve (4) into the outer sleeve (3) before pressing the first and the second clamp rings (10, 11) into the outer sleeve (3).

9. The method according to claim 8, further comprising loosening the press fit, between the inner sleeve (4) and the outer sleeve (3), by pressing the first and the second clamp rings (10, 11) into the outer sleeve (3).

10. The method according to claim 7, further comprising pressing the outer sleeve (3) into a bearing eye (23) of the vehicle component (24) with some reduction of a diameter of the outer sleeve after the first and the second clamp rings (10, 11) are pressed into the outer sleeve (3).

11. The method according to claim 10, further comprising radially contacting the inner sleeve (4) and the outer sleeve (3) after pressing the outer sleeve (3) into the bearing eye (23).

12. A sleeve joint, capable of engaging with a vehicle component of a vehicle, the sleeve joint comprising:
- a ball sleeve having a through-hole extending in an axial direction through the ball sleeve;
- an outer sleeve extending in the axial direction;
- spaced apart first and second clamp rings being arranged inside the outer sleeve;
- an inner sleeve being inserted into the outer sleeve;
- a ball socket being arranged inside the inner sleeve;
- the ball sleeve being rotatably fitted in the ball socket;
- the inner sleeve being sandwiched between and contacting both the first and the second clamp rings, and the inner sleeve being sandwiched between both the ball sleeve and the outer sleeve; and
- an annular free space being formed between the inner sleeve and the outer sleeve and extending over a full axial length of the inner sleeve.

* * * * *